United States Patent
Zhao et al.

(10) Patent No.: US 10,152,353 B2
(45) Date of Patent: Dec. 11, 2018

(54) ACCOUNT ACTIVITY LEVEL BASED-SYSTEM RESOURCE ALLOCATING METHOD AND DEVICE

(71) Applicant: China Construction Bank Corporation, Beijing (CN)

(72) Inventors: Jinxin Zhao, Beijing (CN); Kezun Liang, Beijing (CN); Wei Wang, Beijing (CN); Shunhua Zhang, Beijing (CN); Liqiang Hu, Beijing (CN); Xiaoyu Xie, Beijing (CN); Yinghui Lu, Beijing (CN); Nan Wang, Beijing (CN); Ran Tao, Beijing (CN); Shusheng Chen, Beijing (CN)

(73) Assignee: China Construction Bank Corporation, Beijing (CN)

( * ) Notice: Subject to any disclaimer, the term of this patent is extended or adjusted under 35 U.S.C. 154(b) by 162 days.

(21) Appl. No.: 15/389,023

(22) Filed: Dec. 22, 2016

(65) Prior Publication Data
US 2017/0153917 A1 Jun. 1, 2017

Related U.S. Application Data

(63) Continuation of application No. PCT/CN2015/098823, filed on Dec. 25, 2015.

(30) Foreign Application Priority Data

Nov. 26, 2015 (CN) .......................... 2015 1 0837076

(51) Int. Cl.
*G06F 9/46* (2006.01)
*G06F 9/50* (2006.01)

(52) U.S. Cl.
CPC .................................. *G06F 9/5005* (2013.01)

(58) Field of Classification Search
CPC ..................................................... G06F 9/5005
(Continued)

(56) References Cited

U.S. PATENT DOCUMENTS

2007/0081554 A1 4/2007 Saffre
2008/0316938 A1 12/2008 Shi
(Continued)

FOREIGN PATENT DOCUMENTS

CN 101478450 7/2009
CN 102076097 5/2011
(Continued)

OTHER PUBLICATIONS

State Intellectual Property Office of People's Republic of China, Second Office Action issued in counterpart Chinese Patent Application No. 2015108370764, dated Feb. 7, 2018, 15 pp.
(Continued)

*Primary Examiner* — Camquy Truong
(74) *Attorney, Agent, or Firm* — Fitch, Even, Tabin & Flannery LLP

(57) ABSTRACT

The present disclosure discloses system resource allocating method and device based on account activity level, wherein the method includes: acquiring an account activity level parameter of a user and calculating an account activity level of each user according to the account activity level parameter of the user; determining an account activity level rank of each user according to the account activity level of the user and a preset account activity level rank dividing manner; establishing an account activity level index of each user according to a user number, the account activity level and the account activity level rank of the user; allocating the system resource for performing the information processing
(Continued)

to a target user according to the account activity level index of the target user, where the information processing is to be performed on the target user.

12 Claims, 3 Drawing Sheets

(58) Field of Classification Search
    USPC .......................................................... 718/104
    See application file for complete search history.

(56) References Cited

U.S. PATENT DOCUMENTS

| | | | |
|---|---|---|---|
| 2012/0254442 A1 | 10/2012 | Uemura | |
| 2012/0304188 A1* | 11/2012 | Balmin | G06F 9/5077 718/104 |
| 2013/0232254 A1 | 9/2013 | Srikanth | |

FOREIGN PATENT DOCUMENTS

| | | |
|---|---|---|
| CN | 103095846 | 5/2013 |
| CN | 103379143 | 10/2013 |
| CN | 103873528 | 6/2014 |
| CN | 104268212 | 1/2015 |
| CN | 104965844 | 10/2015 |

OTHER PUBLICATIONS

International Search Report Corresponding to International Application No. PCT/CN2015/098823, dated Aug. 26, 2016, 2 pp.
State Intellectual Property Office of China, Search Report issued for counterpart Chinese Patent Application No. 2015108370764, dated Dec. 27, 2017, 18 pp.
Intellectual Property Office of Singapore, Second Written Opinion issued in Corresponding International Application No. 11201610716V, dated Apr. 2, 2018, 5 pp.
Intellectual Property Office of Singapore, Written Opinion Corresponding to International Application No. 11201610716V, dated Aug. 24, 2017, 5 pp.

* cited by examiner

ACCOUNT ACTIVITY LEVEL BASED-SYSTEM RESOURCE ALLOCATING METHOD AND DEVICE

CROSS-REFERENCE TO RELATED APPLICATIONS

This application is a continuation of International Application No. PCT/CN2015/098823, filed on Dec. 25, 2015, which claims priority to Chinese Patent Application No. 201510837076.4, filed on Nov. 26, 2015, both of which are hereby incorporated by reference in their entireties.

FIELD

The present disclosure relates to the fields of system resource allocation, more particularly, relating to system resource allocating method and system based on account activity level.

BACKGROUND

With the development of Internet technologies and the gradual increase in the number of network users, the number of user accounts controlled by an Internet application system gradually becomes huge, which also causes various problems on the Internet application system. For example, user information services (user login, information inquiry and modification, user business processing, etc.) are slow in response speed, user management costs (hardware servers, softwares, etc.) increase, and so on. These problems directly influence customer experiences of the Internet application system.

As for the Internet application system regarding finance, e-commerce, social contact, etc., there are high demands in transaction/communication real-time performance and highly concurrent processing performance. However, in the traditional user account information management method, the user account information management method without a difference in response processing is adopted, which cannot meet the requirements of quick response for the users who operate or transact frequently, but increases the cost of performing system management on the account information of the users with low account activity level, without satisfying the application requirements of ever-growing user account scales and user transaction/communication request volumes.

With continuous developments of online banking and electronic banking, taking an application system of Chinese Construction Bank (CCB) as an example, its number of users managed thereby is rapidly increasing. In terms of the current status of a personal user account, there exists a large number of inactive "dormant accounts" in each application system, which is a tremendous waste for the user account information management resources; meanwhile, in the context of canceling petty account management charges, it is becoming important problems necessary to be solved currently how to reasonably integrate and manage the inactive "dormant accounts" and frequently-used "active accounts" and how to further improve the customer experience of the user management on the premise of controlling the user management costs.

SUMMARY

In view of the above defects in the prior art, some embodiments of the present disclosure provide a system resource allocating method and device based on account activity level, which may allocate the appropriate system resources to users with different activity level in a targeted manner, thereby increasing the usage efficiency of the system resources as a whole, lowering the management costs and improving the user experience.

Specifically, one embodiment of the present disclosure provides a system resource allocating method based on account activity level including:

acquiring an account activity level parameter of a user and calculating an account activity level of each user according to the account activity level parameter of the user;

determining an account activity level rank of each user according to the account activity level of the user and a preset account activity level rank dividing manner;

establishing an account activity level index of each user according to a user number, the account activity level and the account activity level rank of the user; and allocating system resource for performing information processing to a target user according to the account activity level index of the target user, when the information processing is to be performed on the target user.

Correspondingly, one embodiment of the present disclosure further provides a system resource allocating device based on the account activity level including:

a parameter acquiring module for acquiring an account activity level parameter of a user;

an activeness calculating module for calculating an account activity level of each user according to the account activity level parameter of the user;

a rank dividing module for determining an account activity level rank of each user according to the account activity level of the user and a preset account activity level rank dividing manner;

an index establishing module for establishing an account activity level index of each user according to a user number, the account activity level and the account activity level rank of the user; and a resource allocating module for allocating a system resource for performing an information processing to a target user according to the account activity level index of the target user, where the information processing is to be performed on the target user.

The adoption of embodiments of the present disclosure may have the following advantageous effects.

By means of establishing the account activity level index by a series of processing performed on the account activity level and allocating the resources for performing the information processing to the target user according to the account activity level index of the target user, on the one hand, it may provide more and better system resources for the users with high activity level, which in turn may improve the response speed of the application system to the user with high activity level; on the other hand, it may reduce management costs including hardware server costs and software usage costs on the premise of not influencing the system availability, by means of allocating idle system resources to the users with low activity level. In summary, with the method provided by some embodiments, it may allocate appropriate system resources to the users with different activity level in a targeted manner, thereby increasing the use efficiency of the system resources as a whole, lowering the management costs and improving the user experience.

DETAILED DESCRIPTION OF THE EMBODIMENTS

For the convenience of understanding each aspect, feature and advantage of the technical solution of the present disclosure, the present disclosure will be described in detail in connection with drawings below. It shall be understood that each following embodiment is only used for illustrating, instead of limiting the protection scope of the present disclosure.

Figure 1A:
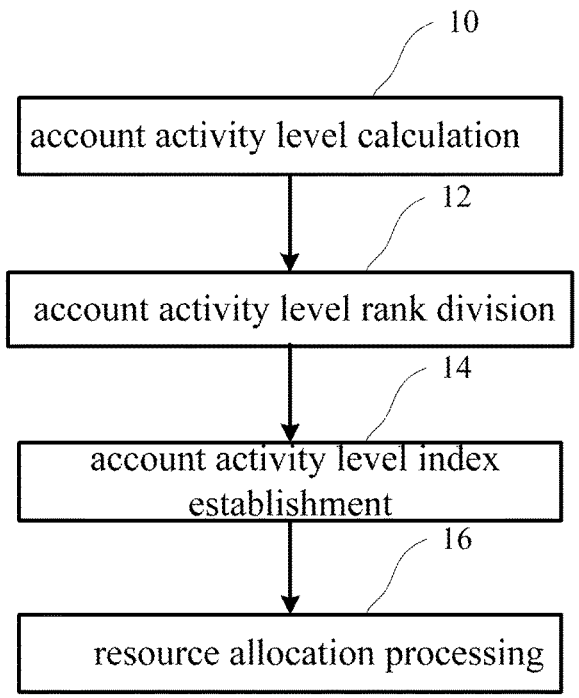
FIG. 1A is a schematic flow chart of the system resource allocating method based on account activity level according to some embodiments of the present disclosure.

FIG. 1A is a schematic flow chart of the system resource allocating method based on account activity level according to some embodiments of the present disclosure. With reference to FIG. 1A, the method includes the processing as follows.

Processing 10: account activity level calculation. Specifically, an account activity level parameter of each user is acquired and an account activity level of each user is calculated according to the account activity level parameter of the user.

Optionally, in one implementation of the present embodiment, the account activity level parameter of the user includes any one or more of the following parameters: number of times of successful logins of a user, member level of the user, user points, number of times of the user modifying a member information, a user browsing page PV, number of times of transactions of the user, a transaction amount of the user, an average amount of each transaction of the user, and an account balance of the user. These parameters may be acquired by monitoring and recording the user behaviors within a specified time (for example, periodically) and reading from a relevant system.

Processing 12: account activity level rank division. Specifically, an account activity level rank of each user is determined according to the account activity level of the user and a preset account activity level rank dividing manner.

Optionally, in one implementation of the present embodiment, the account activity level rank of each user may be determined according to the account activity level of the user and a preset account activity level rank dividing threshold. In another implementation of the present embodiment, the account activity level rank of each user may be determined according to the account activity level of the user, the preset account activity level rank dividing threshold and a preset maximum number of users for each rank. The explanation of the two specific implementations will be mentioned hereinafter, without detailed descriptions here.

Processing 14: an account activity level index establishment. Specifically, the account activity level index of each user is established according to a user number, the account activity level and the account activity level rank of the user. As a result, the account activity level and the account activity level rank of the user may be determined according to the user number of the user. Subsequently, it is possible to perform the resource allocation according to the determined account activity level or the account activity level rank.

Processing 16: resource allocation processing. When information processing is to be performed on a target user, system resource for performing the information processing is allocated to the target user according to the account activity level index of the target user.

In the present embodiment, the target user refers to the user who triggers a relevant system such that the relevant system may process its information. The relevant system may be different systems in different application scenes. For example, in the fields of finance, e-commerce or the like, the relevant system may be a system for taking charge of processing such as user login, information inquiry and modification, business processing, and so on. The system resources includes one or more of CPU resource, memory, cache, storage space, etc., and further includes a priority of the user data processing in case of concurrent processing, that is, in case of highly concurrent processing of the system, there is a limit in the CPU running speed and memory, and the relevant information or data of the user with higher priorities are processed preferentially.

With the method provided by the present embodiments, by means of establishing the account activity level index by a series of processing performed on the account activity level and allocating the resource for performing the information processing to the target user according to the account activity level index of the target users, on the one hand, it may provide more and better system resources for the users with high activity level, which in turn may improve the response speed of the application system to the user with high activity level; on the other hand, it may reduce management costs including hardware server costs and software usage costs on the premise of not influencing the system availability, by means of allocating the idle system resources to the users with low activity level. In summary, with the method provided by some embodiments, it may allocate appropriate system resources to the users with different activity level in a targeted manner, thereby increasing the use efficiency of the system resources as a whole, lowering the management costs and improving the user experience.

Optionally, in one implementation of the present embodiment, in the processing 10, the account activity level parameters of the user within a specified time period may be collected in advance, and then the account activity level of each user within the specified time period may be calculated according to the formula $$\varphi(x) = \sum_{i=1}^{m} \delta_i \alpha_i(x),$$

wherein, x is the user number, m is a total number of the account activity level parameters, $\alpha_i(x)$ is a normalized parameter value of the $i^{th}$ account activity level parameter of the user whose user number is x, $\delta_1$ is an calculation weight of the $i^{th}$ account activity level parameter.

Optionally, in one implementation of the present embodiment, in the processing 12, the preset account activity level rank includes the rank $A_1, A_2, A_3, \ldots, A_n$, whose respective corresponding account activity level sections are:

$A_1: \varphi_1 \leq \varphi(x); A_2: \varphi_2 \leq \varphi(x) < \varphi_1; \ldots ; A_n: \varphi_n \leq \varphi(x) < \varphi_{n-1}.$ The above $\varphi_1, \varphi_2, \varphi_3, \ldots, \varphi_n$ are the preset account activity level rank division thresholds. In the processing 12, the account activity level of each user is sorted and ranked according to the account activity level rank division thresholds $\varphi_1, \varphi_2, \varphi_3, \ldots, \varphi_n$, to realize the allocation of ranks $A_1, A_2, A_3, \ldots, A_n$.

Further, new user may be set with an initial account activity level $\varphi_{new}$ having an adjustable value, so as to divide the account activity level ranks.

Figure 1B:
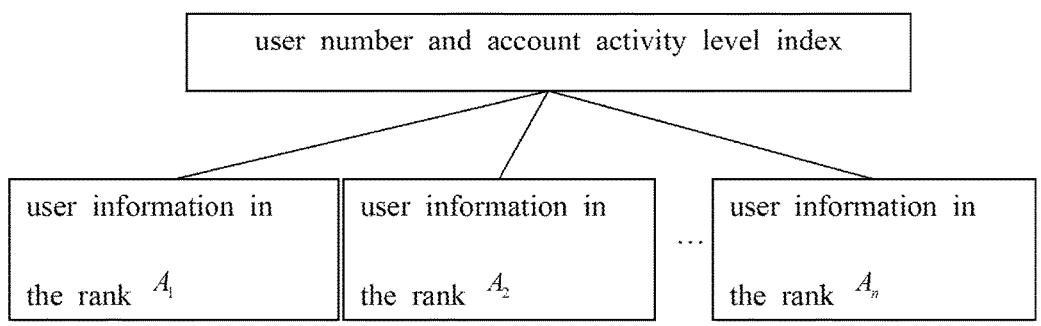
FIG. 1B is a schematic diagram of an account activity level index according to some embodiments of the present disclosure.

Optionally, in another implementation of the present embodiment, taking the limitation of the allocable resources of each account activity level rank into consideration, it is also possible to set a maximum number of users $U_{max}(A_i)$, i=1, 2, ..., n for each of the account activity level ranks $A_1, A_2, A_3, \ldots, A_n$. When the number of users to be allocated for the rank $A_i$ is greater than $U_{max}(A_i)$, the user after $U_{max}(A_i)$ has priority to be allocated to the next rank, circulating in this way until all the users finish the rank division. Exemplarily, FIG. 1B shows the schematic diagram of the account activity level index established in the processing 14. The user information in the rank $A_1$ includes the user number and its corresponding account activity level.

Optionally, in one implementation of the present embodiment, in the processing 14, when the account activity level index of each user is established, it is also possible to generate an account activity level report of each user. In this way, it is possible to subdivide the users according to the account activity level report of each user, which contributes to increasing the accuracy of the business marketing.

Figure 1C:
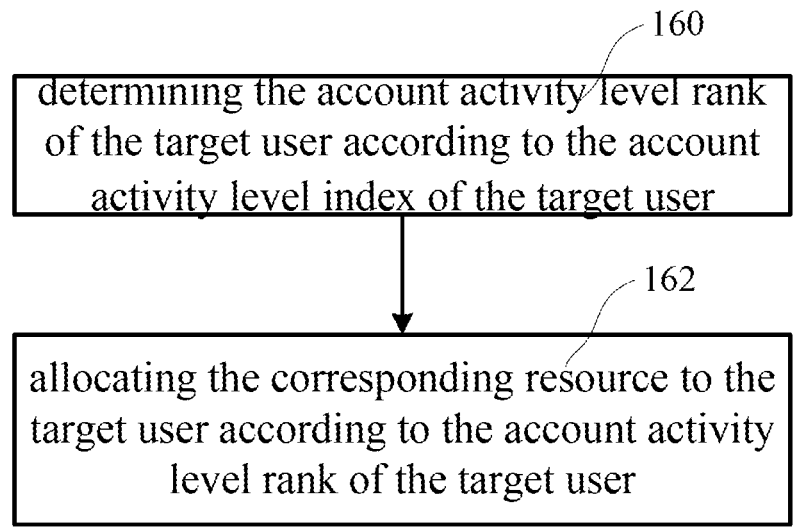
FIG. 1C is a schematic flow chart of a resource allocation processing according to some embodiments of the present disclosure.

Optionally, in one implementation of the present embodiment, with reference to FIG. 1C, the processing 16 may be specifically realized in the following way.

Processing 160: determining the account activity level rank of the target user according to the account activity level index of the target user. For example, the account activity level of the target user is determined by making an inquiry according to the user number of the target user.

Processing 162: allocating the corresponding resource to the target user according to the account activity level rank of the target user. Preferentially, the users corresponding to different account activity level ranks may be provided with different system resources. Of course, it is also possible to adopt the following manner to realize the processing 162. If the account activity level rank of the target user is higher than a preset reference rank, cache is allocated to the target user, and a preferential use right of system resource is provided for the target user; if the account activity level rank of the target user is lower than the reference rank, the idle system resource is allocated to the target user.

In one specific application scene of the present implementation, taking the user account information management system as an example, the user account information management system may be deployed into a single server or a server cluster system. When the target user launches a request to the user account information management system, the user account information management system may allocate the cache to the target user, whose account activity level rank is relatively highly (for example, corresponding to the rank A1), to perform rapid response processing within the highly concurrent time, and provide him or her with the preferential use right of the system resource; whereas the user account information management system may provide the target user whose the account activity level rank is relatively low, with the idle resource for response processing.

The method examples and its implementations of the embodiments of the present disclosure are explained above in connection with drawings, and the device examples of the embodiments of the present disclosure will be explained below in connection with drawings.

Figure 2A:
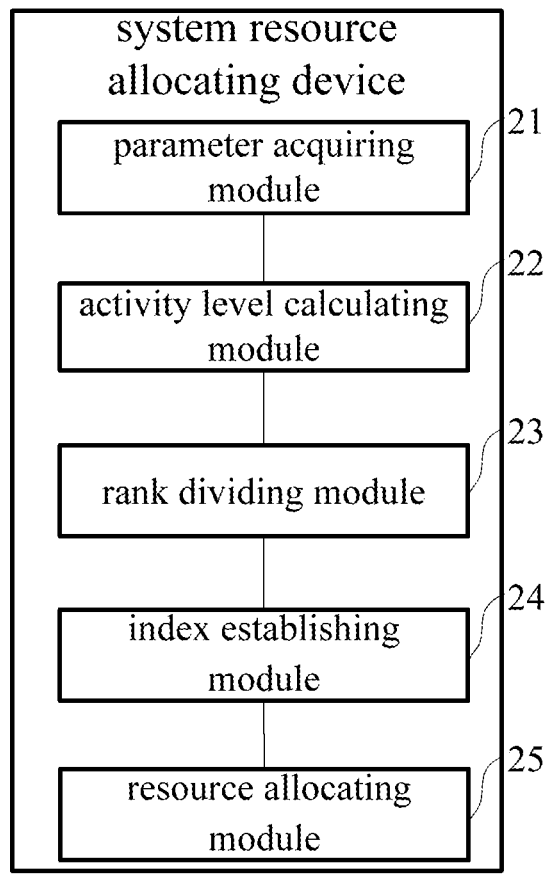
FIG. 2A is a block diagram of the system resource allocating device based on account activity level according to some embodiments of the present disclosure.

FIG. 2A is a block diagram of the system resource allocating device based on account activity level according to some embodiments of the present disclosure. With reference to FIG. 2A, the system resource allocating device includes a parameter acquiring module 21, an activity level calculating module 22, a rank dividing module 23, an index establishing module 24 and a resource allocating module 25. The detailed explanation is made below.

In one embodiment, the parameter acquiring module 21 acquires the account activity level parameter of the user. The account activity level parameter of the user includes any one or more of the following parameters: number of times of successful login of the user, member level of the user, user points, number of times of the user modifying the member information, the user browsing page PV (Page View), number of times of transactions of the user, the transaction amount of the user, the average amount of each transaction of the user, and the account balance of the user.

The activity level calculating module 22 calculates the account activity level of each user according to the account activity level parameter of the user. For example, the account activity level of each user within the specified time period is calculated according to the formula $$\varphi(x) = \sum_{i=1}^{m} \delta_i \alpha_i(x),$$

wherein, x is the user number, m is the total number of the account activity level parameters, $\alpha_i(x)$ is the normalized parameter value of the $i^{th}$ account activity level parameter of the user whose user number is x, $\delta_i$ is the calculation weight of the $i^{th}$ account activity level parameter.

Figure 2B:
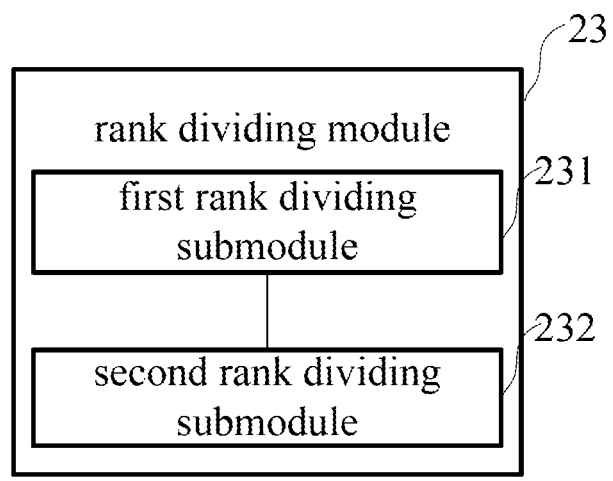
FIG. 2B is an example of the block diagram of the rank dividing module of the system resource allocating device shown in FIG. 2A.

The rank dividing module 23 determines the account activity level rank of each user according to the account activity level of the user and the preset account activity level rank dividing manner. Optionally, in one implementation of the present embodiment, as shown in FIG. 2B, the rank dividing module 23 includes: a first rank dividing submodule 231 for determining the account activity level rank of each user according to the account activity level of the user and the preset account activity level rank dividing threshold; and/or a second rank dividing submodule 232 for determining the account activity level rank of each user according to the account activity level of the user, the preset account activity level rank dividing threshold and the preset maximum number of users for each rank.

The index establishing module 24 establishes the account activity level index of each user according to the user number, the account activity level and the account activity level rank of the user.

The resource allocating module 25 allocates the system resource for performing information processing to the target user according to the account activity level index of the target user, when the information processing is to be performed on the target user.

Figure 2C:
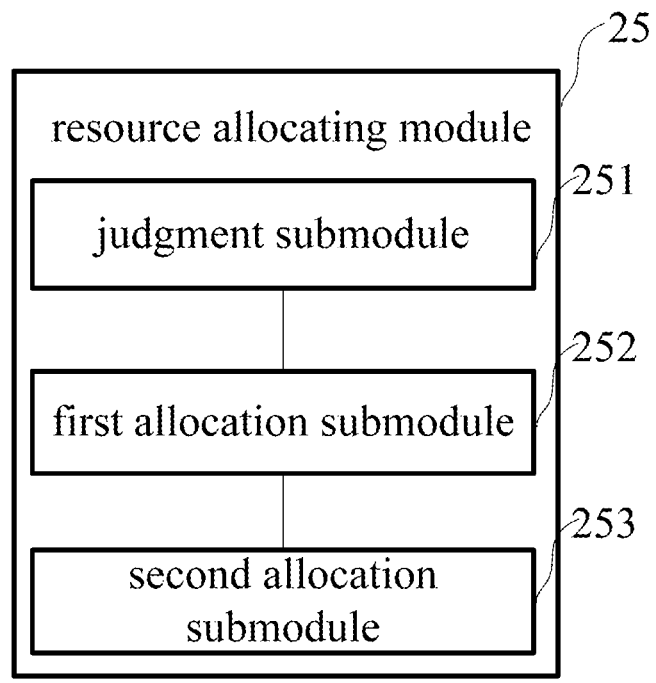
FIG. 2C is an example of the block diagram of the resource allocating module of the system resource allocating device shown in FIG. 2A.

Optionally, in one implementation of the embodiment, as shown in FIG. 2C, the resource allocating module 25 includes a judgment submodule 251 for determining the account activity level rank of the target user according to the account activity level index of the target user, calling a first allocation submodule 252 where the account activity level rank of the target user is relatively high, and calling a second allocation submodule 253 where the account activity level rank of the target user is relatively low; the first allocation submodule 252 for allocating the cache to the target user and providing the preferential use right of system resource for the target user; and the second allocation submodule 253 for allocating the idle system resource to the target user.

Optionally, in one implementation of the embodiment, in addition to the parameter acquiring module 21, the activity level calculating module 22, the rank dividing module 23, the index establishing module 24 and the resource allocating module 25, the system resource allocating device may further include a report generating module for generating the account activity level report of each user when the index establishing module 24 establishes the account activity level index of each user.

By adopting the system resource allocating device provided by some embodiments of the present disclosure, on the one hand, it may provide more and better system resources for the users with high activity level, which in turn improve the response speed of the application system to the user with high activity level; on the other hand, it may reduce management costs including hardware server costs and software usage costs on the premise of not influencing the system availability, by means of allocating idle system resources to the users with low activity level. In summary, with the system resource allocating device provided by the some embodiments, it may allocate the appropriate system resources to the users with different activity level in a targeted manner, thereby increasing the use efficiency of the system resources as a whole, lowering the management costs and improving the user experience.

In the present device embodiments, regarding the explanation of the relevant names and terms, and regarding the detailed explanation of the processing performed by each module/submodule or the executable processing, please refer to the corresponding explanation in the method embodiments, without repeated description herein.

In addition, persons skilled in the art shall also understand that in one specific example of the present embodiment, the system resource allocating device may be a server, the server may include a processor configured to perform the steps of the system resource allocating method of the embodiments of the present disclosure. The system resource allocating device may also be a specific device installed into the server specifically for realizing the purpose of the present disclosure.

By the above description of the embodiment, persons skilled in the art may clearly know that the present disclosure may be realized through the manner of software combined with a hardware platform. Based on such understanding, all or part of the contributions made by the technical solution of the present disclosure to the background art may be embodied in the form of software products. The computer software product may be stored in the storage medium, such as ROM/RAM, magnetic disk, optical disk, etc., including several instructions to enable a computer device (may be a personal computer, server or network device, etc.) to perform the method of some parts of each embodiment or embodiments of the present disclosure.

Persons skilled in the art shall understand that the above disclosed is only the embodiment of the present disclosure. Of course, this cannot limit the claim scope of the present disclosure, but still belong to the scope covered by the claims of the present disclosure according to the equivalent change in the embodiment of the present disclosure.

What is claimed is:

1. A system resource allocating method based on an account activity level, comprising:
    acquiring an account activity level parameter of a user and calculating an account activity level of each user according to the account activity level parameter of the user;
    determining an account activity level rank of each user according to the account activity level of the user and a preset account activity level rank dividing threshold;
    establishing an account activity level index of each user according to a user number, the account activity level and the account activity level rank of the user; and
    allocating system resource for performing information processing to a target user according to the account activity level index of the target user, when the information processing is to be performed on the target user.

2. The method according to claim 1, wherein the account activity level parameter of the user comprises any one or more of following parameters:
    number of times of successful login of the user, member level of the user, user points, number of times of the user modifying a member information, a user browsing page PV, number of times of transactions of the user, a transaction amount of the user, an average amount of each transaction of the user, and an account balance of the user.

3. The method according to claim 1, wherein the calculating the account activity level of each user according to the account activity level parameter of the user comprises:
    calculating the account activity level of each user within a specified time period according to $$\varphi(x) = \sum_{i=1}^{m} \delta_i \alpha_i(x);$$

wherein x is the user number, m is a total number of the account activity level parameters, $\alpha_i(x)$ is a normalized parameter value of a $i^{th}$ account activity level parameter of the user whose user number is x, $\delta_i$ is a calculation weight of the $i^{th}$ account activity level parameter.

4. The method according to claim 1, wherein the determining the account activity level rank of each user according to the account activity level of the user, the preset account activity level rank dividing threshold and a preset maximum number of users for each rank.

5. The method according to claim 1, further comprising:
    generating an account activity level report for each user when the account activity level index of the user is established.

6. The method according to claim 1, wherein the allocating the system resource for performing the information processing to the target user according to the account activity level index of the target user comprises:
    determining the account activity level rank of the target user according to the account activity level index of the target user;
    allocating a cache to the target user and providing a preferential use right of system resource for the target user where the account activity level rank of the target user is higher than a reference rank; and allocating an idle system resource to the target user where the account activity level rank of the target user is lower than the reference rank.

7. A system resource allocating device based on the account activity level, comprising a processor configured to:

acquire an account activity level parameter of a user;

calculate an account activity level of each user according to the account activity level parameter of the user;

determine an account activity level rank of each user according to the account activity level of the user and a preset account activity level rank dividing threshold;

establish an account activity level index of each user according to a user number, the account activity level and the account activity level rank of the user; and allocate a system resource for performing an information processing to a target user according to the account activity level index of the target user, where the information processing is to be performed on the target user.

8. The device according to claim 7, wherein the account activity level parameter of the user comprises any one or more of following parameters:

number of times of successful login of the user, member level of the user, user points, number of times of the user modifying a member information, an user browsing page PV, number of times of transactions of the user, a transaction amount of the user, an average amount of each transaction of the user, and a account balance of the user.

9. The device according to claim 7, wherein the processor is further configured to calculate the account activity level of each user within a specified time period according to $$\varphi(x) = \sum_{i=1}^{m} \delta_i \alpha_i(x);$$

wherein x is the user number, m is a total number of the account activity level parameters, $\alpha_i(x)$ is a normalized parameter value of a $i^{th}$ account activity level parameter of the user whose user number is x, $\delta_i$ is a calculation weight of the $i^{th}$ account activity level parameter.

10. The device according to claim 7, wherein the processor is further configured to perform:

determining the account activity level rank of each user according to the account activity level of the user, the preset account activity level rank dividing threshold and a preset maximum number of users for each rank.

11. The device according to claim 7, wherein the processor is further configured to:

generate an account activity level report for each user when the account activity level index of the user is established.

12. The device according to claim 7, wherein the processor is further configured to:

determine the account activity level rank of the target user according to the account activity level index of the target user, allocate a cache to the target user and providing a preferential use right of system resource for the target user where the account activity level rank of the target user is higher than a reference rank, and allocate an idle system resource to the target user where the account activity level rank of the target user is lower than the reference rank.

* * * * *